United States Patent
Moser

(10) Patent No.: US 7,137,329 B1
(45) Date of Patent: Nov. 21, 2006

(54) CIRCULAR SAW CLUTCH ASSEMBLY

(76) Inventor: Bruce A. Moser, 128 Sage St., Lime Springs, IA (US) 52155

( * ) Notice: Subject to any disclaimer, the term of this patent is extended or adjusted under 35 U.S.C. 154(b) by 58 days.

(21) Appl. No.: 10/950,908

(22) Filed: Sep. 28, 2004

(51) Int. Cl.
B26D 1/14 (2006.01)
(52) U.S. Cl. .................. 83/543; 83/477.2; 83/665; 83/DIG. 1; 192/56.62
(58) Field of Classification Search ............. 192/83, 192/56.62, 56.57, 103 C; 83/698.11, DIG. 1, 83/543, 477.2; 30/388; 464/36, 39; 254/903
See application file for complete search history.

(56) References Cited

U.S. PATENT DOCUMENTS

| | | | |
|---|---|---|---|
| 1,657,274 A * | 1/1928 | Niedhammer | 173/93.6 |
| 2,209,155 A * | 7/1940 | Fagg | 192/56.62 |
| 2,236,101 A * | 3/1941 | Kirkland | 192/69.5 |
| 2,513,798 A | 7/1950 | Hatfield | |
| 2,775,327 A * | 12/1956 | Gearhart | 192/56.57 |
| 3,092,983 A * | 6/1963 | Huber | 464/46 |
| 3,203,523 A * | 8/1965 | Gilder et al. | 192/56.57 |
| 3,266,535 A * | 8/1966 | Brodie | 30/390 |
| 3,483,902 A | 12/1969 | Schiffers et al. | |
| 3,491,839 A * | 1/1970 | McIntire | 173/93.6 |
| 3,937,036 A * | 2/1976 | Sauerwein | 464/36 |
| 4,205,572 A * | 6/1980 | Weiner | 83/666 |
| 4,239,096 A * | 12/1980 | Smilgys et al. | 192/103 C |
| 4,343,214 A | 8/1982 | Schadlich | |
| 5,152,207 A * | 10/1992 | Mayfield | 83/485 |
| 5,984,020 A * | 11/1999 | Meyer et al. | 173/2 |
| 6,045,303 A * | 4/2000 | Chung | 408/124 |
| 6,132,435 A * | 10/2000 | Young | 606/104 |
| 6,295,910 B1 * | 10/2001 | Childs et al. | 83/698.11 |
| 6,701,629 B1 * | 3/2004 | Krondorfer et al. | 30/390 |
| 2003/0173178 A1 * | 9/2003 | Sasaki | 192/3.51 |

FOREIGN PATENT DOCUMENTS

GB 813687 * 11/1955 ............... 195/56 K

* cited by examiner

Primary Examiner—Boyer D. Ashley
Assistant Examiner—Laura M. Brean

(57) ABSTRACT

A circular saw clutch assembly includes an elongated rod that is coupled to a table saw assembly. A peripheral flange is integrally attached to the rod. The flange has a plurality of ball bearings mounted therein. A first washer abuts the flange and includes a plurality of depressions therein positioned for removably receiving the ball bearings. The rod is extended through a saw blade. A first fastener secures the saw blade against the first washer. A second washer is abutted against the flange. A biasing assembly is positioned on the rod and biases the second washer against the flange so that the second washer biases each of the ball bearings into one of the depressions. The rod rotates freely of the first washer and the saw blade when an item being cut by the saw blade arrests rotation of the saw blade.

3 Claims, 5 Drawing Sheets

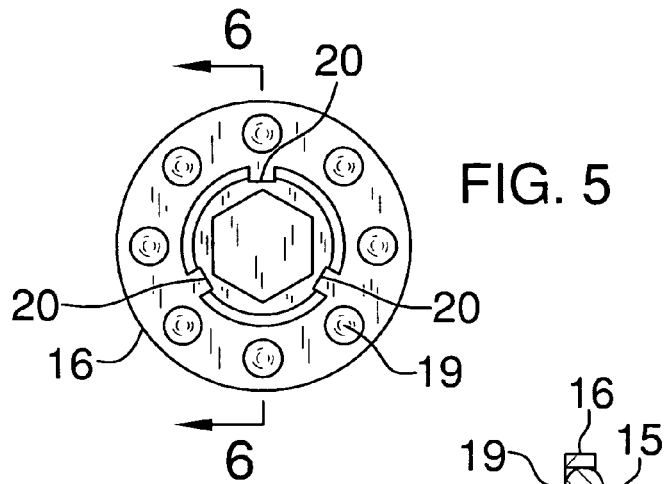
FIG. 5
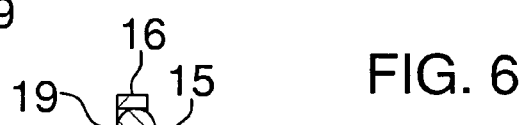
FIG. 6
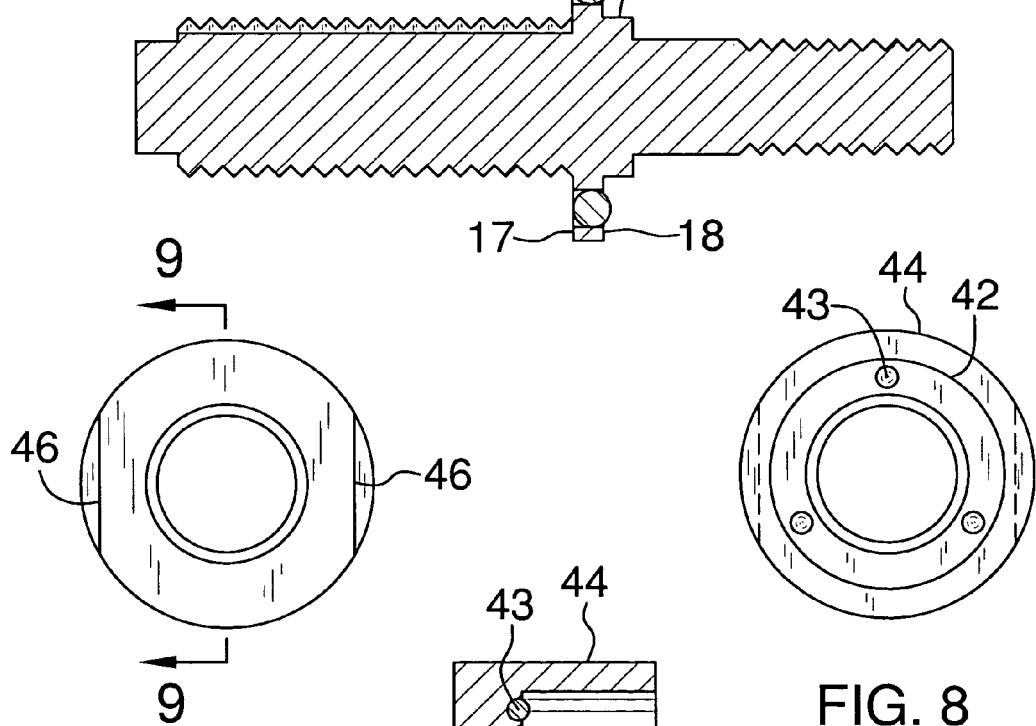
FIG. 7
FIG. 8
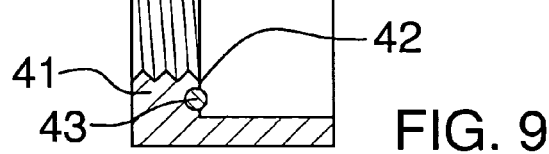
FIG. 9

US 7,137,329 B1

CIRCULAR SAW CLUTCH ASSEMBLY

BACKGROUND OF THE INVENTION

1. Field of the Invention

The present invention relates to circular saw coupling devices and more particularly pertains to a new circular saw coupling device for preventing the kicking back of an item being cut by allowing a saw blade to stop rotating once a blade catches the item.

2. Description of the Prior Art

The use of circular saw coupling devices is known in the prior art. In particular, those such as U.S. Pat. No. 6,295,910 describe a device that holds a saw blade on a circular saw and which prevents kicking back of the saw blade when it binds during the cutting of an object. Another such device is shown in U.S. Pat. No. 4,205,572.

While these devices fulfill their respective, particular objectives and requirements, the need remains for a device that is more retrofittable to existing circular saw assemblies than is found in the prior art. In particular, the primary shaft that holds the saw blade to the circular saw assembly should be generally conventional so that it may be readily retrofitted to saw assemblies. Additionally, the device should be adjustable so that a user of the device may selectively determine how easily the saw blade is released from the shaft when it binds to an object being cut. This will allow the user to determine the sensitivity of the device with respect to the thickness and harness of the object being cut.

SUMMARY OF THE INVENTION

The present invention meets the needs presented above by generally comprising an elongated rod that has a first end and a second end. The second end is mechanically coupled to a table saw assembly so that the table saw assembly can selectively rotate about a longitudinal axis of the rod. A peripheral flange is integrally attached to the rod and is positioned between first and second ends of the rod. The flange has a plurality of ball bearings therein. Each of the ball bearings has a diameter greater than a width of the flange measured from the first side to the second side. The outer surface of the rod is threaded. A first washer is rotatably positioned on the rod and abuts the second side of the flange. The first washer has a distal side and a proximal side with respect to the flange. The proximal side has a plurality of depressions therein. Each of the depressions is positioned for removably receiving one of the ball bearings. The rod is removably extended through a saw blade so that the saw blade abuts the distal side of the first washer. A first fastener is threadably coupled to the rod and abutted against the saw blade so that the saw blade is positioned between the first fastener and the first washer. A second washer is rotatably positioned on the rod and is abutted against the first side of the flange. A biasing assembly is removably positioned on the rod between the second washer and the first end of the rod and is adapted for biasing the second washer against the flange so that the second washer biases each of the ball bearings into one of the depressions. An amount of force is applied on the second washer by the biasing assembly may be selectively adjusted. The rod will rotate freely of the first washer and the saw blade when an item being cut by the saw blade arrests rotation of the saw blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front view of a rod of the present invention.

FIG. 6 is a cross-sectional view taken along line 6—6 of FIG. 5 of the present invention.

FIG. 7 is a front view of a second fastener of the present invention.

FIG. 8 is a back view of the second fastener of the present invention.

FIG. 9 is a cross-sectional view taken along line 9—9 of FIG. 7 of the present invention.

DESCRIPTION OF THE PREFERRED EMBODIMENT

Figure 1:
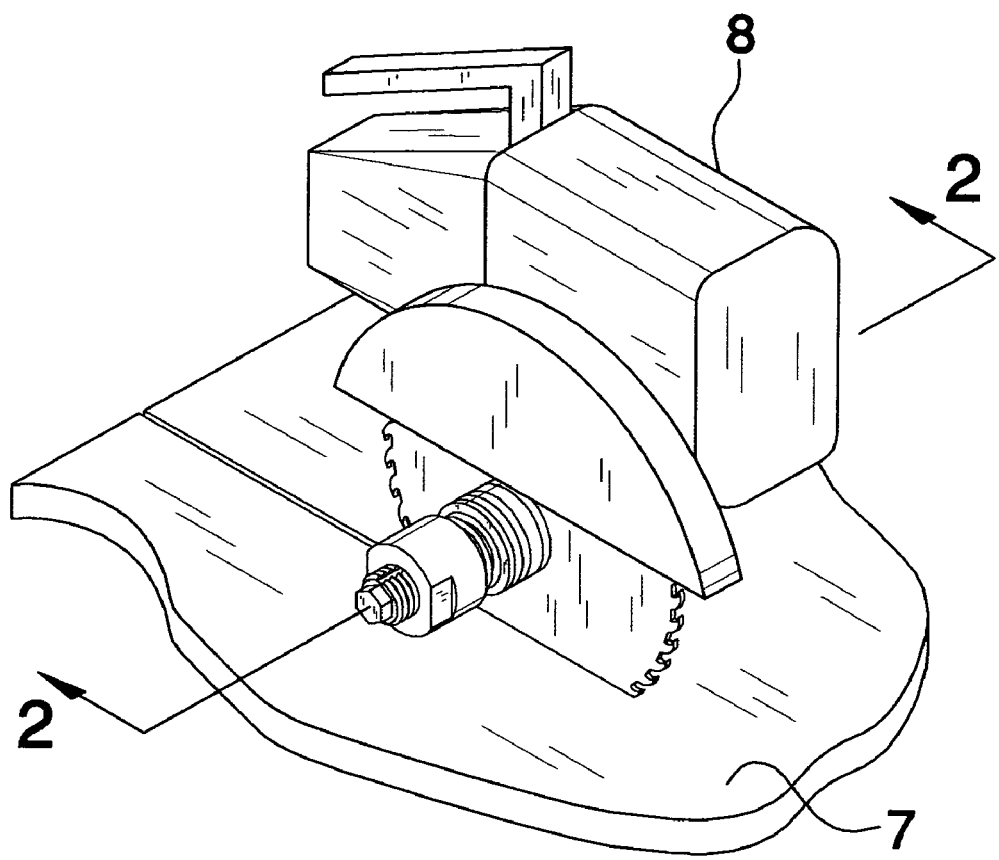
FIG. 1 is a perspective in-use view of a circular saw clutch assembly according to the present invention.
Figure 2:
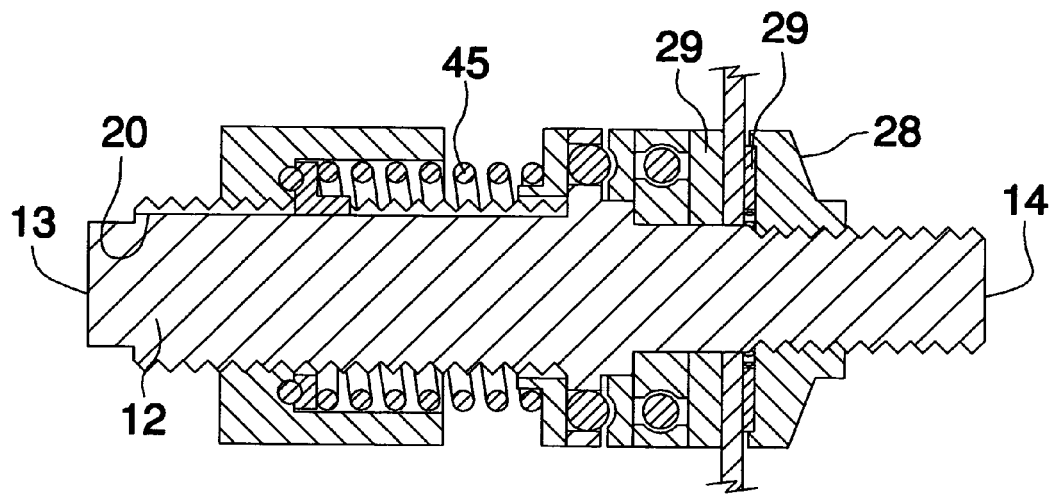
FIG. 2 is a cross-sectional view taken along line 2—2 of the present invention.

With reference now to the drawings, and in particular to FIGS. 1 through 15 thereof, a new circular saw coupling device embodying the principles and concepts of the present invention and generally designated by the reference numeral 10 will be described.

As best illustrated in FIGS. 1 through 15, the circular saw clutch assembly 10 generally comprises an elongated rod 12 that has a first end 13 and a second end 14. The second end 14 is mechanically coupled to a conventional table saw assembly 8 so that the table saw assembly 8 may selectively rotate about a longitudinal axis of the rod 12. The first end 13 is preferably of a conventional size used for saw mounting shafts of a circular saw to a saw assembly 8. The rod 12 has a collar 15 integrally attached thereto and extends around the rod 12. The collar 15 is positioned between the first 13 and second 14 ends. A peripheral flange 16 is integrally attached to the rod 12. The flange 16 abuts the collar 15 and is positioned between the collar 15 and the first end 13 of the rod 12. The flange 16 has a first side 17 and a second side 18. The flange 16 has a plurality of ball bearings 19 rotatably mounted therein. Each of the ball bearings 19 has a diameter greater than a width of the flange 16 measured from the first side 17 to the second side 18. The rod 12 has an outer surface that has plurality of elongated slots 20 therein. The slots 20 extend from the first end 13 to the flange 16 and preferably numbers three slots. The outer surface from the first end 13 to the flange 16 and from the second end 14 toward the collar 15 is threaded.

A first washer 22 is rotatably positioned on the rod 12 so that the first washer 22 is positioned on the collar 15 and abuts the second side 18 of the flange 16. The first washer 22 has a distal side 23 and a proximal side 24 with respect to the flange 16. The proximal side 24 has a plurality of depressions 25 therein. Each of the depressions 25 is positioned for removably receiving one of the ball bearings 19. The rod 12 is removably extended through the saw blade 9 so that the saw blade 9 abuts the distal side 23 of the first washer 22.

A first fastener 28 is threadably coupled to the rod 12 and abuts against the saw blade 9 so that the saw blade 9 is positioned between the first fastener 28 and the first washer 22. Spacers 29 may be positioned between the first fastener 28 and the blade 9 and the first washer 22 and the blade 9.

A second washer 30 is rotatably positioned on the rod 12 and is abutted against the first side 17 of the flange 16. A shoulder 31 is preferably integrally coupled to the second washer 30 that extends toward the first end 13 of the rod 12 when the second washer 30 is positioned on the rod 12.

A biasing assembly 40 is removably positioned on the rod 12 between the second washer 30 and the first end 13 of the rod 12 and is adapted for biasing the second washer 30 against the flange 16. The second washer 30 biases each of the ball bearings 19 into one of the depressions 25. An amount of force applied on the second washer 30 by the biasing assembly 40 may be selectively adjusted. The biasing assembly 40 includes a second fastener 41 that is threadably coupled to the rod 12 and is positioned between the flange 16 and the first end 13 of the rod 12. The second fastener 41 has an inner surface 42 facing the flange 16. A plurality of bearings 43 is mounted in the inner surface 42. A peripheral sleeve 44 is integrally attached to the second fastener 41. The sleeve 44 extends toward the flange 16 and is spaced from the rod 12. A spring 45 is wound around the rod 12. The spring 45 extends between and biases apart the second fastener 41 and the second washer 30. The spring 45 extends into the sleeve 44 and over the shoulder 31. The second fastener 41 preferably has a pair of oppositely positioned flat edges 46 for aiding in the rotation of the second fastener 41 on the rod 12.

A third washer 50 is positioned on the rod 12 and abuts the inner surface 42 of the second fastener 41. The third washer 50 has an inner perimeter that has a plurality of protuberances 51 attached thereto. Each of the protuberances 51 is positioned for being extended into one of the slots 20. The third washer 50 has a plurality of wells 52 therein. Each of the wells 52 is positioned for receiving one of the bearings 43 mounted in the inner surface 42 of the second fastener 41. As the second fastener 41 is rotated, the bearings 43 in the second fastener 41 snap into the wells 52. The number of "snaps" helps a user to determine how loose or tight the spring 45 is biased against the second washer 30. The third washer 50 prevents the second fastener 41 from rotating off of the rod 12.

In use, the clutch assembly 10 is mounted on the table saw 8 as indicated above.

Figure 3:
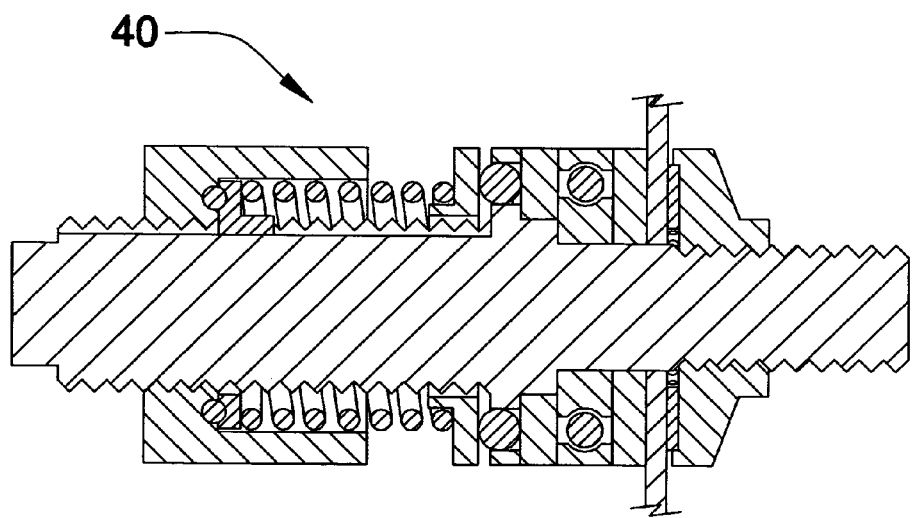
FIG. 3 is a cross-sectional view of the present invention.
Figure 4:
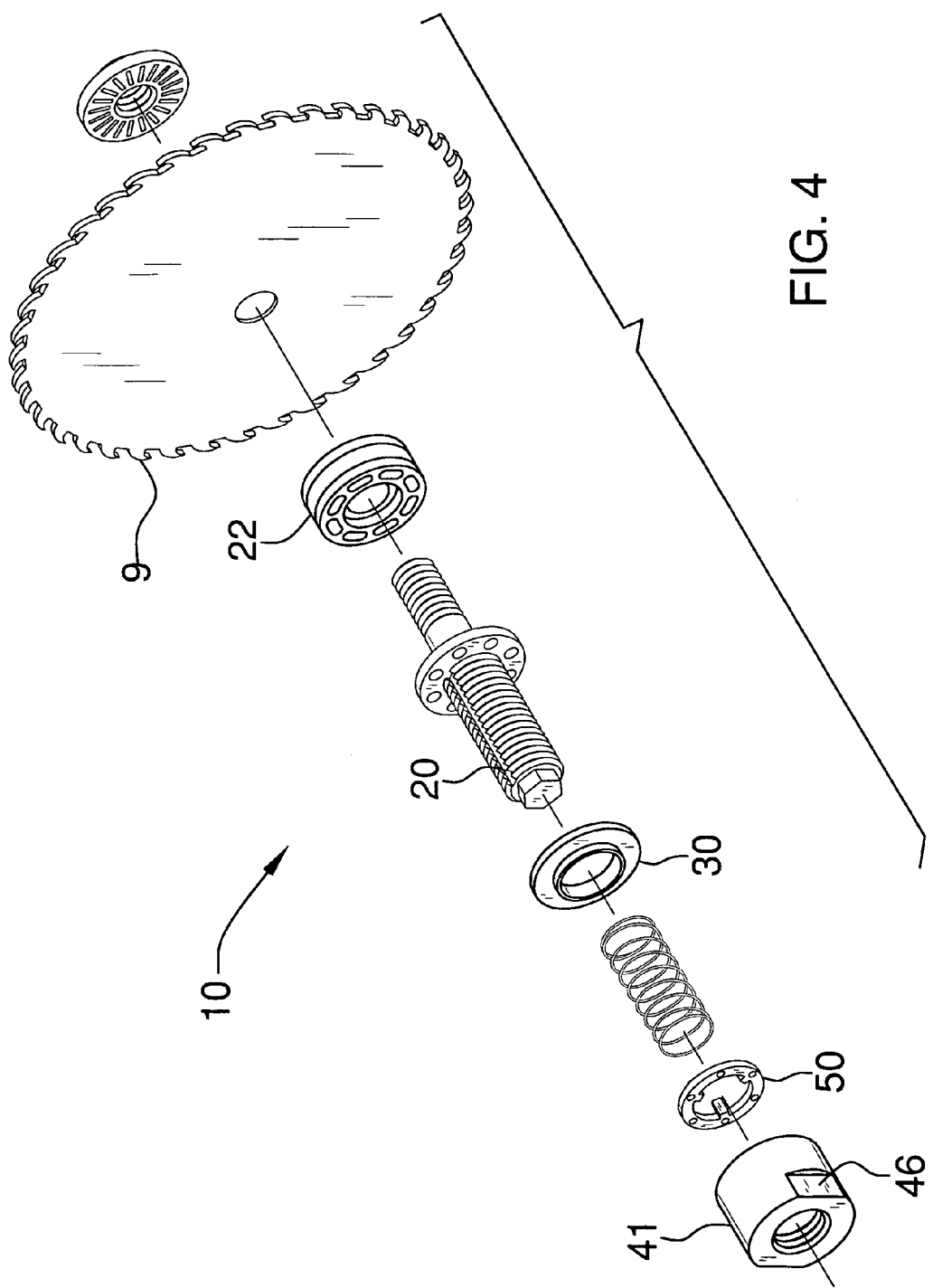
FIG. 4 is a perspective view of the present invention.
Figure 10:
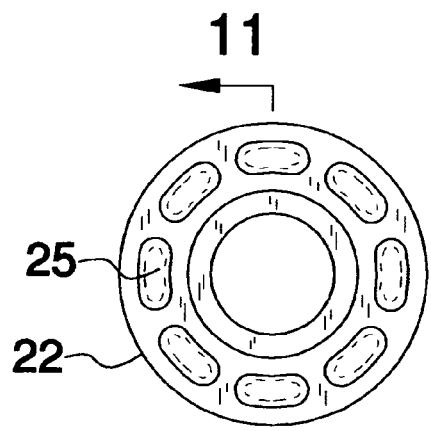
FIG. 10 is a front view of a first washer of the present invention.
Figure 11:
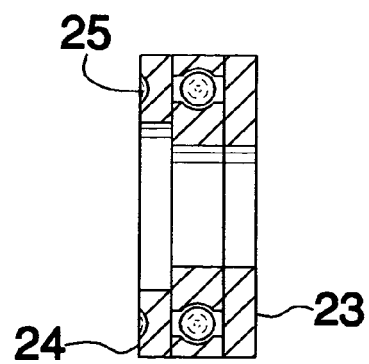
FIG. 11 is a cross-sectional view taken along line 11—11 of FIG. 10 of the present invention.
Figure 12:
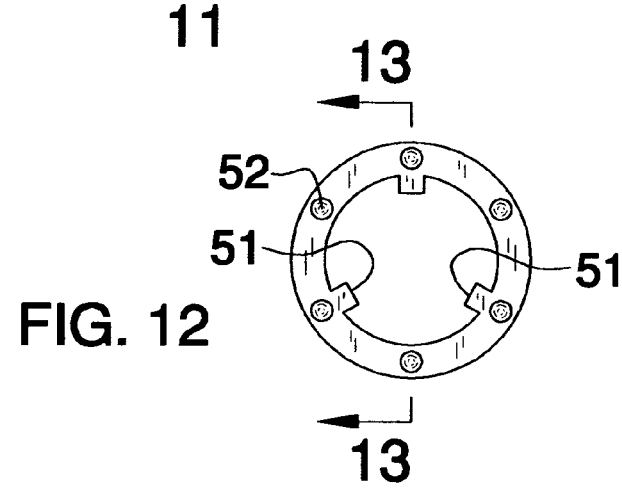
FIG. 12 is a front view of a third washer of the present invention.
Figure 13:
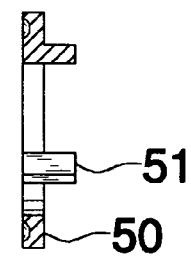
FIG. 13 is a cross-sectional view taken along line 13—13 of FIG. 12 of the present invention.
Figure 14:
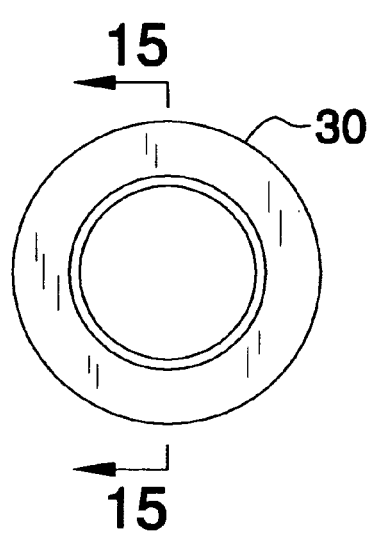
FIG. 14 is a front view of a second washer of the present invention.
Figure 15:
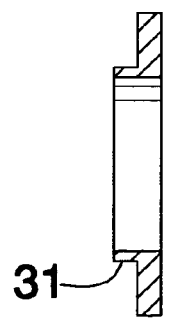
FIG. 15 is a cross-sectional view taken along line 15—15 of FIG. 14 of the present invention.

While cutting an item 7, such as a piece of wood, the clutch assembly 10 rotates the saw blade 9 in a conventional manner. However, if the item 7 being cut arrests the saw blade 9, the rotational force of the rod 12 forces causes the flange 16 to continue rotating so that the bearings 19 in the flange 16 move out of the depressions 25 and force the second washer 30 away from the flange 16 as shown in FIG. 3. This allows the saw blade 9, along with first washer 22, to stop rotating while the rod 12 continues to rotate. By adjusting the second fastener 41, the user of the clutch assembly 10 can select how easily the rod 12 will be allowed to slip with respect to the saw blade 9.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A kick-back prevention coupler for removably coupling a table saw blade to a table saw assembly, said coupler including:

an elongated rod having a first end and a second end, said second end being mechanically coupled to the table saw assembly such that the table saw assembly may selectively rotate about a longitudinal axis of said rod, a peripheral flange being integrally attached to said rod and being positioned between first and second ends of said rod, said flange having a plurality of ball bearings therein, each of said ball bearings having a diameter greater than a width of said flange measured from said first side to said second side, said outer surface of said rod being threaded, said rod having an outer surface having plurality of elongated slots therein, said slots extending from said first end to said flange;

a first washer being rotatably positioned on said rod and abuts said second side of said flange, said first washer has a distal side and a proximal side with respect to said flange, said proximal side having a plurality of depressions therein, each of said depressions being positioned for removably receiving one of said ball bearings, wherein said rod is removably extended through the saw blade such that the saw blade abuts said distal side of said first washer;

a first fastener being threadably coupled to said rod and abutted against the saw blade such that the saw blade is positioned between said first fastener and said first washer;

a second washer being rotatably positioned on said rod and being abutted against said first side of said flange;

a biasing assembly being removably positioned on said rod between said second washer and said first end of said rod and being adapted for biasing said second washer against said flange, said second washer biasing each of said ball bearings into one of said depressions, wherein an amount of force being applied on said second washer by said biasing assembly may be selectively adjusted; said biasing assembly including;

a second fastener being threadably coupled to said rod and being positioned between said flange and said first end of said rod, said fastener having an inner surface facing said flange;

a plurality of bearings being mounted in said inner surface of said second fastener; and a spring being wound around said rod, said spring extending between and biasing apart said second fastener and said second washer;

a third washer being positioned on said rod and abutting said inner surface of said second fastener, said third washer having an inner perimeter having a plurality of protuberances attached thereto, each of said protuberances being positioned for being positionable in one of said slots, said third washer having a plurality of wells therein, each of said wells being positioned for receiving one of said bearings mounted in said inner surface of said second fastener; and wherein said rod will rotate freely of said first washer and the saw blade when rotation of the saw blade is arrested by an item being cut by the saw blade.

2. The kick-back prevention coupler according to claim 1, wherein a peripheral sleeve is integrally attached to said second fastener, said sleeve extending toward said flange and being spaced from said rod such that said spring extends into said sleeve.

3. A kick-back prevention coupler for removably coupling a table saw blade to a table saw assembly, said coupler including:

an elongated rod having a first end and a second end, said second end being mechanically coupled to the table saw assembly such that the table saw assembly may selectively rotate about a longitudinal axis of said rod, said rod having a collar integrally attached thereto and extending around said rod, said collar being positioned between said first and second ends, a peripheral flange being integrally attached to said rod, said flange abutting said collar and being positioned between said collar and said first end of said rod, said flange having a first side and a second side, said flange having a plurality of ball bearings therein, each of said ball bearings having a diameter greater than a width of said flange measured from said first side to said second side, said rod having an outer surface having plurality of elongated slots therein, said slots extending from said first end to said flange, said outer surface from said first end to said flange and from said second end toward said collar being threaded;

a first washer being rotatably positioned on said rod such that said first washer is positioned on said collar and abuts said second side of said flange, said first washer has a distal side and a proximal side with respect to said flange, said proximal side having a plurality of depressions therein, each of said depressions being positioned for removably receiving one of said ball bearings, wherein said rod is removably extended through the saw blade such that the saw blade abuts said distal side of said first washer;

a first fastener being threadably coupled to said rod and abutted against the saw blade such that the saw blade is positioned between said first fastener and said first washer;

a second washer being rotatably positioned on said rod and being abutted against said first side of said flange;

a biasing assembly being removably positioned on said rod between said second washer and said first end of said rod and being adapted for biasing said second washer against said flange, said second washer biasing each of said ball bearings into one of said depressions, wherein an amount of force being applied on said second washer by said biasing assembly may be selectively adjusted, said biasing assembly including;

a second fastener being threadably coupled to said rod and being positioned between said flange and said first end of said rod, said second fastener having an inner surface facing said flange, a plurality of bearings being mounted in said inner surface;

a peripheral sleeve being integrally attached to said second fastener, said sleeve extending toward said flange and being spaced from said rod;

a spring being wound around said rod, said spring extending between and biasing apart said second fastener and said second washer;

a third washer being positioned on said rod and abutting said inner surface of said second fastener, said third washer having an inner perimeter having a plurality of protuberances attached thereto, each of said protuberances being positioned for being positionable in one of said slots, said third washer having a plurality of wells therein, each of said wells being positioned for receiving one of said bearings mounted in said inner surface of said second fastener; and wherein said rod will rotate freely of said first washer and the saw the saw blade.

* * * * *